May 12, 1931.  J. B. FISHER ET AL  1,805,137
TRANSMISSION AND REVERSE GEAR
Filed Nov. 15, 1928  4 Sheets-Sheet 1

Witness:
William P. Kilroy

Inventors
James B. Fisher
James E. DeLong
Brown, Jackson, Boettcher & Dienner
Attys

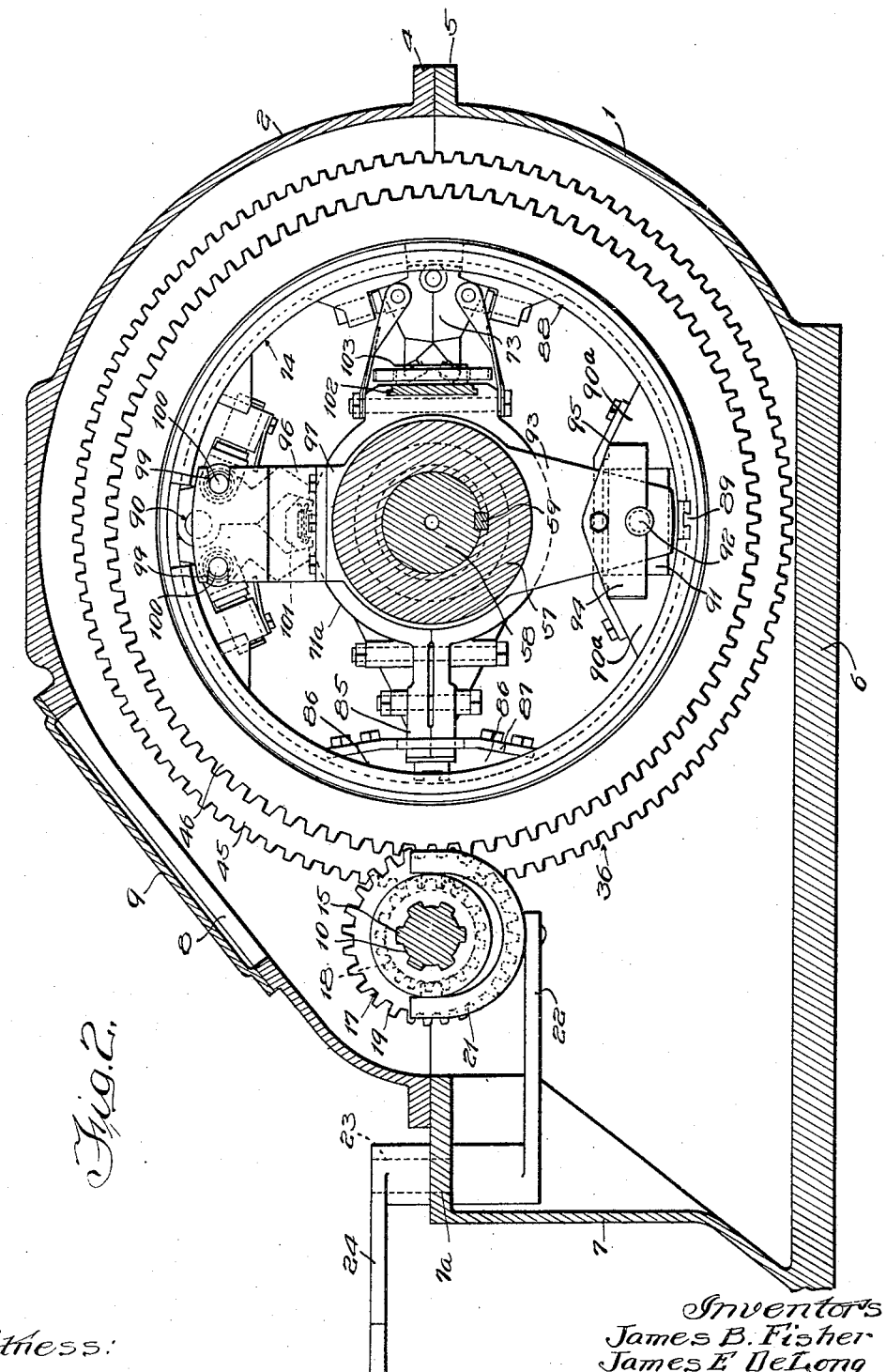

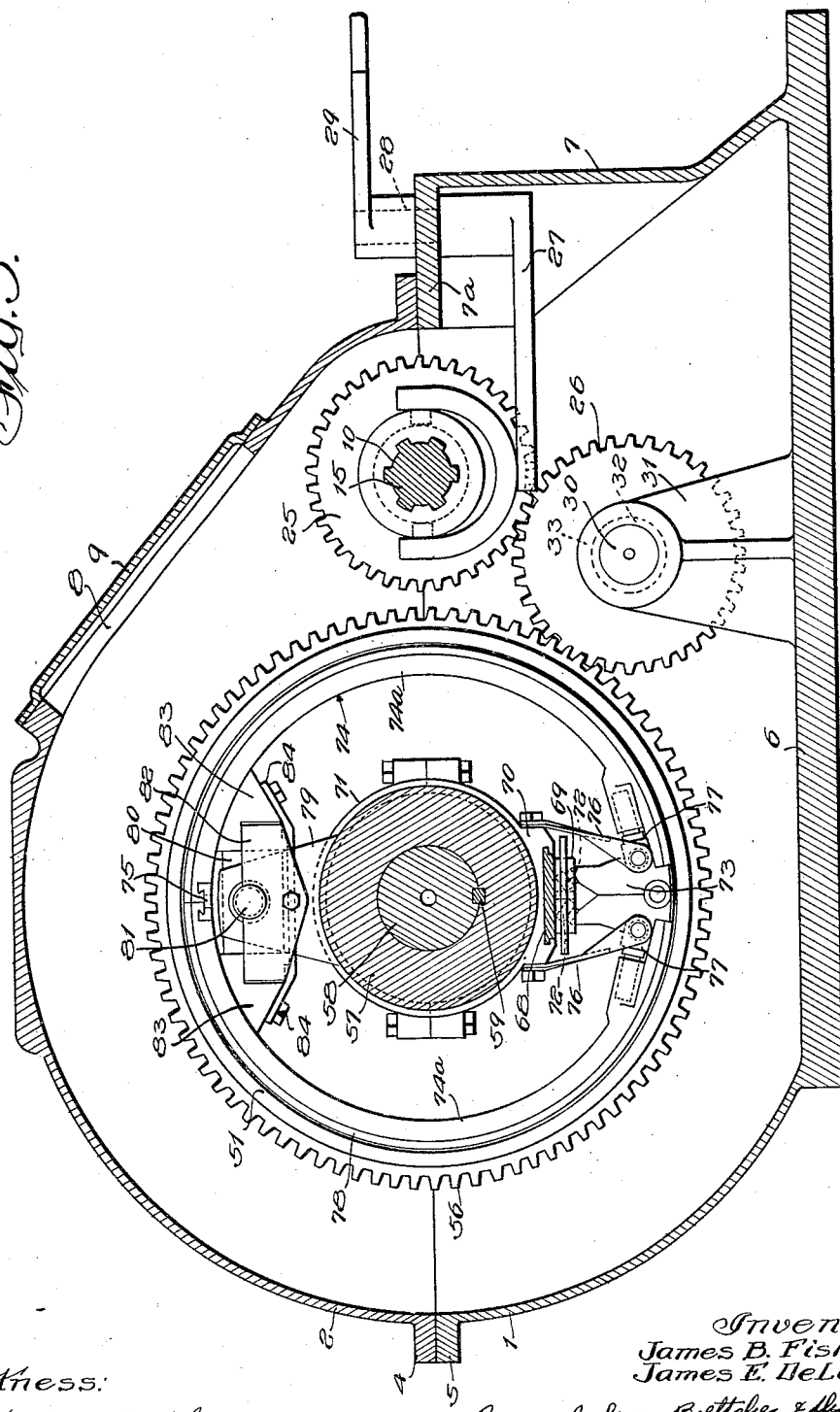

May 12, 1931. J. B. FISHER ET AL 1,805,137
TRANSMISSION AND REVERSE GEAR
Filed Nov. 15, 1928  4 Sheets-Sheet 4
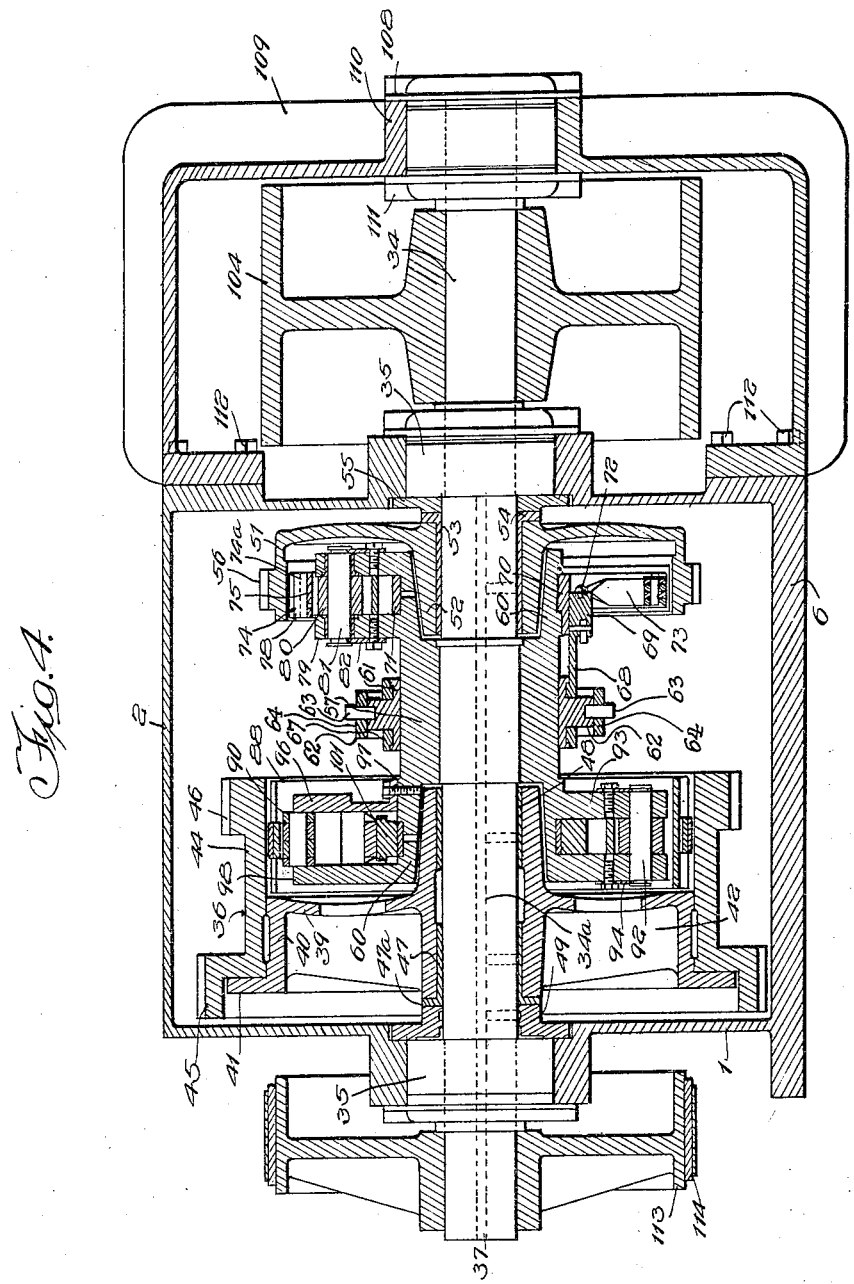
Inventors
James B. Fisher
James E. DeLong Patented May 12, 1931

1,805,137

UNITED STATES PATENT OFFICE

JAMES B. FISHER AND JAMES E. DE LONG, OF WAUKESHA, WISCONSIN, ASSIGNORS TO WAUKESHA MOTOR COMPANY, OF WAUKESHA, WISCONSIN, A CORPORATION OF WISCONSIN

TRANSMISSION AND REVERSE GEAR

Application filed November 15, 1928. Serial No. 319,687.

This invention relates to transmissions, and more particularly to a transmission unit adapted for use with internal combustion engines and having both forward and reverse drives.

Our invention has to do more particularly with a transmission unit especially adapted for heavy duty work such as is encountered in oil fields. One of the main objects of our invention is to provide a transmission of compact and rugged construction, particularly suited for use in oil field operations. Another object is to provide a transmission in which the parts are so related that the stresses are distributed substantially uniformly reducing liability of breakage or damage.

A further object is to provide a transmission in which the power input shaft can be adjusted so as to project beyond either end, selectively, of the transmission housing thus permitting the motor for driving this shaft to be placed at either end of the transmission housing as conditions may require. Further objects and advantages will appear from the detailed description.

In the drawings:

Fig. 2 is a section taken substantially on line 2—2 of Fig. 1;

Fig. 3 is a section taken substantially on line 3—3 of Fig. 1;

Fig. 4 is a section taken substantially on line 4—4 of Fig. 1;

Figure 1:
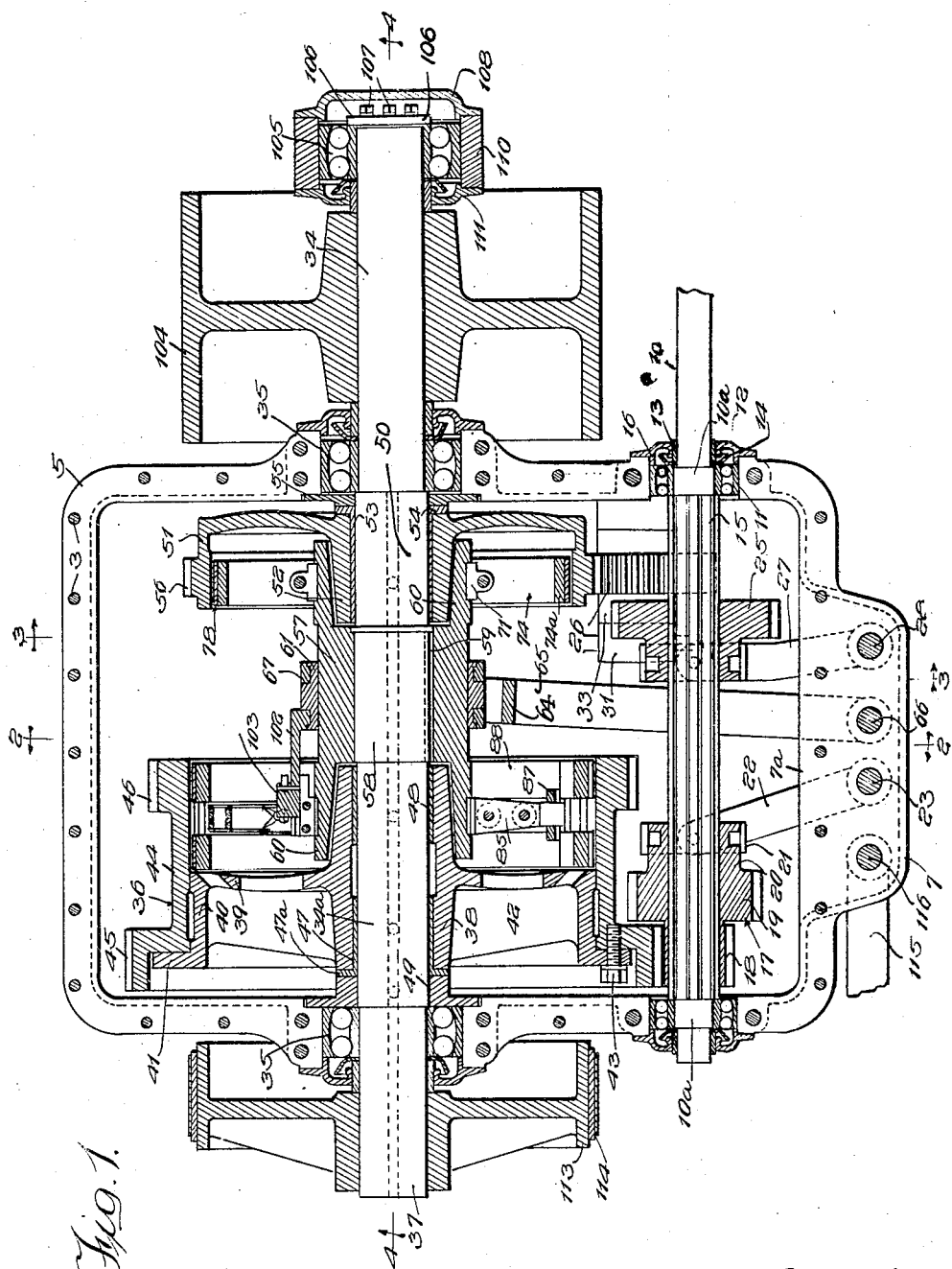
Fig. 1 is a horizontal sectional view through a transmission in accordance with our invention, the upper section of the housing being removed and parts being shown in elevation.

The transmission is disposed within a suitable housing comprising a lower section 1 and an upper section 2 secured together by bolts 3 inserted through flanges 4 and 5 of the upper and lower sections, respectively. The lower section 1 includes a base 6 and an offset 7, certain of the bolts 3 passing through the top wall 7a of this offset. The upper section 2 is provided with a hand hole or opening 8 normally closed by a door or plate 9 secured in position by cap screws or in any other suitable manner.

A power input or drive shaft 10 is rotatably mounted in the housing in ball bearing 11. Retainers 12 are secured to the end walls of the housing in a suitable manner as by means of cap screws, and receives spacers 13 secured about the shaft 10. An oil thrower 14 is confined between spacer 13 and the inner raceway or ring of the bearing structure 11. The inner rings of the ball bearings are confined between the oil throwers 14 and the shoulders at the ends of the splined portion 15 of shaft 10 disposed within the housing, this portion 15 being of greater diameter than the adjacent bearing portion 10a of the shaft. The outer ring of each bearing structure is held against outward movement by a shoulder 16 of the oil retainer 12. The power input or drive shaft 10 is thus supported for rotation in the housing 1 and is held against endwise movement therein, it being noted that the ball bearing structures 11 are also thrust bearings to take up any endwise thrust of the shaft.

A forward drive pinion structure 17 is splined upon portion 15 of shaft 10. This structure includes a first or low speed pinion 18 and a second or high speed pinion 19, these two pinions being secured together in a suitable manner, as by being integrally formed. The structure 17 is provided with a neck 20 having a circumferential groove which receives the pins of a fork 21 suitably connected to the inner end of a shift arm 22.

This arm is secured, at its outer end, upon the lower end of a rod 23 rockably mounted through the top wall 7a of offset 7. A shift lever 24 is suitably secured upon the upper end of rod 23, above wall 7a, and projects outwardly in position to be readily grasped by the operator. A reverse pinion 25 is splined on portion 15 of shaft 10 and is shifted thereon, into and out of mesh with an idler gear 26, by means of a shift arm 27 secured on the lower end of a rod 28 passing through wall 7a, a shift lever 29 being fixed upon the upper end of this rod. Idler gear 26 is mounted upon a lay shaft 30 suitably secured to the adjacent end wall of the housing. The inner end of the lay shaft 30 is supported by a bracket or standard 31 extending upwardly from the base 6. Preferably, an anti-friction bushing 32 is disposed about the shaft 30 between the same and hub 33 of gear 26.

As previously noted, the splined portion 15 of shaft 10 is of greater diameter than the bearing shoulder 10a of this shaft. This permits of the pinion structures 17 and 25 being slid off of the drive shaft toward the left as considered in Fig. 1, the spacer and bearing structure at this end of the shaft being first removed. By this construction, it is possible to remove the drive shaft and reverse it in the housing, the pinions being removed from the shaft and replaced thereon so as to be disposed in proper relation to the gear structures to be driven by these pinions.

The drive shaft is thus adjustable so as to project from either end, selectively, of the housing. This has the advantage that the motor to which the drive shaft is, in practice, connected can be placed at either end of the housing as conditions may require.

A driven shaft 34 is mounted in the housing in parallel relation to the drive shaft 10, this shaft 34 being rotatably supported in anti-friction bearing means 35 which have associated therewith oil throwers and oil retainers, the bearing structures and associated parts being similar to the bearing structures and associated parts for the drive shaft 10.

A forward drive gear structure 36 is mounted upon a portion 34a of shaft 34 which is of slightly greater diameter than the outer end portion 37 of this shaft. This provides a shoulder which abuts the inner ring of the bearing structure 35 to hold the shaft against endwise movement in one direction. The gear structure 36 includes a hub member comprising a hub 38 having a radial flange 39 from the periphery of which extends an axially disposed flange 40 provided at its outer end with a radially disposed flange 41. The flanges 39 and 40 are connected to each other and to the hub 38 by relatively wide radial spokes or ribs 42. Flange 41 is secured in a suitable manner, as by means of set screws 43, to a drum 44 which seats upon the outer face of flange 40.

This drum carries, at its outer end, a first or low speed gear 45. The drum 44 projects inwardly a relatively great distance beyond flange 39 and carries, at its inner end, a second or high speed gear 46. The hub 38 is preferably mounted upon bushings 47 and 48, bushing 47 being provided, at its outer end, with a peripheral flange 47a which contacts the inner end of an angular spacing collar 49 disposed about portion 34a of shaft 34 and confined between the end wall of the housing and the bushing. The forward drive gear structure is thus loosely mounted upon the shaft 34 and the hub 38 is of approximately the same length as the drum 44 and gears 45 and 46, this hub having ample bearing surface, which is desirable as preventing any undue looseness or play of the gear structure upon the shaft.

A reverse drive gear structure is mounted upon portion 50 of shaft 34 adjacent the other end of the housing, this portion 50 being of the same diameter as portion 34a. The reverse drive gear structure includes a drum 51 having a hub 52 mounted upon portion 50 of the shaft, a bronze bushing 53 being preferably disposed between this hub and the shaft. This bushing has an outer flange 54 at its outer end which is confined between hub 52 and spacing collar 55, the outer face of which abuts the end wall of the housing. It will be noted that the hub 52 is of somewhat greater length than the drum 51, thus providing ample bearing for the drum, which is desirable.

This drum carries a reverse gear 56 which meshes with the idler gear 26, it being noted that the drum 51 is also loose upon the driven shaft 34. The pinions 18 and 19 of the pinion structure 17 are adapted to mesh with the gears 45 and 46, respectively, this pinion structure being shifted so as to bring the pinions into mesh with the gears, selectively, or to dispose the pinion structure in inoperative position with the pinions thereof out of mesh with both of the gears, as is known.

We provide means for selectively clutching the gear structures to the driven shaft 34 whereby this shaft may be driven forwardly at either one of the two forward drive means, or can be driven reversely, optionally. Any suitable or preferred type of clutch structure may be employed for this purpose, though we prefer to employ the friction clutch illustrated. This clutch may include a hub 57 which is secured to a central portion 58 of shaft 34, of increased diameter, in a suitable manner as by being keyed thereon as at 59. This hub is recessed from each end to provide, in effect, end sleeves 60 which receive hub 52 of drum 51 and the inner portion of hub 38, these sleeves extending into the drums 51 and 44. The hub 57 of the clutch structure is thus disposed between the hub of the gear structures and may serve the function of a spacing member to prevent endwise movement of the structures toward each other.

By having the hub of the clutch structure recessed from its ends to provide sleeves 60, it is possible to dispose the clutch structure between the gear structures without increasing the over-all length of the housing to a material extent, the hub 57 being comparatively short.

A collar 61 is loosely mounted upon hub 57 for sliding movement axially thereof. This collar is provided with central diametrically opposite lugs 62 (Fig. 4) which receive pins 63 passing through the arm of a fork 64 at the inner end of a shift arm 65 secured on the lower end of a rod 66 passing through the top wall 7a of offset 7. A shift lever (not shown) is secured on the upper end of the rod 66 for actuating the same to shift the collar 61 in the desired direction upon the hub 57. Two rings 67 are loosely mounted upon the collar 61 and are held spaced apart thereon axially thereof. These rings are confined against movement from each other in a suitable manner, as by means of flanges at the end of collar 61 extending into rabbets at the outer end of the ring 67, as illustrated.

An arm 68 extends from one of the rings 67 and is provided at its outer end with a wedge element 69 which is connected, by tongue and slot connections (Figs. 2 and 3), to a boss 70 projecting from a split collar 71 loosely mounted about sleeve 60 of hub 57. Wedge element 69 operates between two rollers 72 mounted on the arms of a toggle lever structure 73 connecting the ends of the two sections 74a of an expansible clutch band 74.

The sections 74a are connected at their other ends by a suitable joint 75 and this band is normally held contracted by springs 76 secured to the boss 70 at the side thereof, these springs being suitably connected by members 77 to sections 74a, the connecting members being preferably adjustable. When the collar 61 is shifted toward the right, as considered in Figs. 1 and 4, beyond neutral position, the wedge element 69 engages between the rollers 72 and opens the toggle expanding the clutch band 74, which is preferably provided with a facing of friction material 78, such as leather, into close contact with the surrounding flange of drum 51, the inner face of which is finished and polished for cooperation with the band. The drum 51 is thus clutched to the band 74.

Sleeve 60 which extends into the drum 51, is provided with two integral arms 79 disposed oppositely to the boss 70, these arms being spaced apart lengthwise of the sleeve. The split collar 71 is disposed between the two arms 79 and a block 80 is secured between the outer ends of these arms by a pin 81 passing through the arms and the block, this pin being secured in position by locking plates 82. The block 80 is slidably mounted between lugs 83 projecting inwardly from the sections 74a of clutch band 74, these lugs being connected by a strap 84 secured thereto.

When it is desired to drive the shaft 34 in reverse direction, reverse pinion 25 is shifted into mesh with idler gear 26, the pinion structure 17 being first moved into inoperative position. The collar 61 is then shifted from neutral position toward the right expanding the clutch band 74 into gripping contact with the drum 51 which is, at this time, being driven from the shaft 10 through the pinion 25 and gears 26 and 56. The clutch band 74 is then driven with the drum 51 and drives the shaft 34 in reverse direction through the lugs 83, block 80, pin 81, arms 79 and hub 57 which is keyed to the shaft.

A clutch is provided at the outer end of the other sleeve 60 of hub 57 for clutching the same to the drum 44, this clutch being disposed within the drum. The clutch within the drum 44 may be of similar construction and operation to the clutch within the drum 51, though ordinarily we prefer to use a clutch of somewhat different construction. The clutch within drum 44 includes a clutch band 74 which is constructed and operated similarly to the band 74 of the clutch for drum 51. Referring more particularly to Figs. 2 and 4, the band 74 is not connected to the sleeve 60 but, at a point diametrically opposite to the toggle lever structure, is provided with lugs 86 connected by a strap 87 and receiving between them an arm 85.

The band 74 is connected by arm 85 and lugs 86 to a split collar 71a secured about sleeve 60 and free to turn thereon. The clutch band 74 is thus mounted for turning movement with drum 44. Band 74 is disposed between two outer clutch bands 88 constructed similarly to clutch band 74. The sections of each of the bands 88 are connected at one end by a suitable joint or connection 89 and, at their other end, by a toggle structure 90. Lugs 90a bridge the clutch band 74 and connect the sections of the bands 88 adjacent the joint 89 thereof. A block 91 is slidably mounted between these lugs and is secured, by a pin 92, between the outer ends of a pair of arms 93 formed integrally with sleeve 60. A locking plate 94 is mounted on each of the arms 93 and locks the pin 92 against endwise movement. The lugs 90a are connected by a strap 95 secured thereto. A bracket or angle arm 96 is suitably secured to a boss 97 on sleeve 60 at one side of the clutch band and is disposed in alignment with an arm 98 at the other side of the band and formed integrally with sleeve 60. These arms are provided with suitable slots 99 for guiding the pin 100 which connects the arms of the toggle structure 90 to the sections of the clutch band 88. Collar 71a is provided with a pin or tooth 101 disposed betwen the inner ends of the arms of the toggle 90.

An arm 102 projects from the other ring 67 and carries, at its outer end, a wedge element 103 which operates between the rollers on the arms of the toggle structure 73 of the inner clutch band 74.

The wedge member 103 is oppositely related to the wedge member 69 of the clutch within drum 51. When the collar 61 is in its inoperative position, that is, is in neutral position as illustrated in Fig. 1, both of the wedge members are in inoperative or neutral position and the two gear structures are free from shaft 34. To drive the shaft 34 in forward direction, the pinion structure 17 is shifted into mesh with the gear structure 36 with pinion 18 meshing gear 45, or pinion 19 meshing gear 46, depending upon whether it is desired to drive shaft 34 at low speed or at second or high speed. Collar 61 is then moved to the left, as considered in Fig. 1, thus clutching the band 74 to drum 44 which is now driven. Band 74 rotates with the drum thus turning the collar 71a and causing pin or tooth 101 to operate the toggle 90 so as to expand the clutch bands 88 which act to clutch the sleeve 60 to drum 44 establishing driving connection between this drum and shaft 34. The inner face of drum 44 is machined and polished to provide a surface adapted for clutching cooperation with the bands of the clutching structure within this drum.

By constructing and arranging the clutch structure as illustrated and described, the unit as a whole is compact, while being rugged and well able to withstand the stresses to which it is subjected in use, and either of the gear structures desired can be quickly clutched to shaft 34 for driving it in the desired direction.

A pulley wheel 104 is secured on shaft 34 at one end of the housing. The shaft extends outwardly beyond the pulley and the end of the shaft is mounted in a ball bearing structure 105 similar to the structures in which the shaft is mounted in the housing. A flat plate 106 is secured in a suitable manner, as by means of cap screws 107, to the end of the shaft and abuts the outer end of the inner ring or race of the bearing 105. A cap plate 108 is suitably secured to a bracket frame 109 of substantially U-shape, this frame being provided with a relatively wide collar 110 which supports bearing structure 105 and to which plate 108 and oil retainer 111 are suitably secured. The bracket frame 109 is of substantially U-shape and is disposed vertically about pulley wheel 104, the ends of this frame being secured to the upper and lower sections of the end of the housing in a suitable manner, as by means of cap screws 112. A brake drum 113 is secured on the other end of shaft 34 for cooperation with a brake band 114 of known type disposed about the drum. Band 114 is normally held expanded out of contact with drum 113 in a manner well understood in the art. This brake band may be operated in a suitable manner, as by means of suitable connection to an arm 115 secured on the lower end of a rod 116 rockably mounted in the top wall 7a of offset 7, this arm extending through a suitable slot or opening in the wall of the offset. A brake lever (not shown), may be secured on the upper end of rod 116 for operating the brake band.

The brake band may, of course, be operated in any other suitable or preferred manner and any suitable type of brake may be employed. It will be noted that the gear structure, the clutch structure, and the brake drum and pulley wheel are all mounted upon the same shaft and the end of this shaft beyond the pulley wheel is connected to the housing through the bracket frame 109. By thus constructing and arranging the unit, the stresses are uniformly distributed and the unit as a whole is of rugged construction and well adapted for the heavy work to which it is subjected in use.

What we claim is:—

1. In a transmission, a driven shaft, a forward drive gear structure having a hub loose on the shaft, a reverse drive gear structure having a hub loose on the shaft, a driving hub keyed on the shaft between the gear structures and having its ends recessed, the recessed ends of the driving hub providing sleeves receiving the hubs of and extending into the gear structures, said gear structures being held against movement away from each other and the driving hub acting to space the gear structures apart and to hold them against movement toward each other, said gear structures being open at their inner ends and constituting clutch drums, means at the ends of said sleeves and cooperating with the drums for clutching either of the gear structures, optionally, to the driven shaft, a drive shaft, and means for establishing driving connections between the drive shaft and either of the gear structures, optionally.

2. In a transmission, a driven shaft, gear structures each having a hub loose on the shaft, a hub keyed on the shaft between the gear structures and having its ends recessed, the recessed ends of the hub keyed on the shaft receiving the hubs of the gear structures, said gear structures being held against movement away from each other and the hub which is keyed on the shaft serving to space the gear structures apart and hold them against movement toward each other, means for optionally establishing driving connections between the hub keyed on the shaft and the gear structures, selectively, for driving the shaft through the hub keyed thereon, a drive shaft, and means for establishing driving connections between the drive shaft and the gear structures, selectively.

In witness whereof, we hereunto subscribe our names this 9th day of November, 1928.

JAMES B. FISHER.
JAMES E. DE LONG.